(12) United States Patent
Moritz

(10) Patent No.: US 6,970,985 B2
(45) Date of Patent: Nov. 29, 2005

(54) STATICALLY SPECULATIVE MEMORY ACCESSING

(75) Inventor: Csaba Andras Moritz, Amherst, MA (US)

(73) Assignee: Bluerisc Inc., Amherst, MA (US)

( * ) Notice: Subject to any disclaimer, the term of this patent is extended or adjusted under 35 U.S.C. 154(b) by 449 days.

(21) Appl. No.: 10/191,946

(22) Filed: Jul. 9, 2002

(65) Prior Publication Data

US 2004/0010675 A1 Jan. 15, 2004

(51) Int. Cl.[7] .............................................. G06F 12/00

(52) U.S. Cl. ..................... 711/154; 711/137; 717/140; 717/151

(58) Field of Search ............................... 717/151, 140; 711/137, 154, 202

(56) References Cited

U.S. PATENT DOCUMENTS

| | | |
|---|---|---|
| 5,410,669 A | 4/1995 | Biggs et al. |
| 5,630,143 A | 5/1997 | Maher et al. |
| 5,655,124 A | 8/1997 | Lin |
| 5,704,053 A | 12/1997 | Santhanam |
| 5,774,685 A | 6/1998 | Dubey |
| 5,805,907 A | 9/1998 | Loper et al. |
| 5,857,104 A | 1/1999 | Natarjan et al. |
| 5,864,697 A | 1/1999 | Shiell |
| 5,875,464 A | 2/1999 | Kirk |
| 5,933,860 A | 8/1999 | Emer et al. |
| 5,949,995 A | 9/1999 | Freeman |
| 5,966,544 A | 10/1999 | Sager |
| 6,105,139 A | 8/2000 | Dey et al. |
| 6,219,796 B1 | 4/2001 | Bartley |
| 6,256,743 B1 | 7/2001 | Lin |
| 6,272,676 B1 | 8/2001 | Haghighat |
| 6,334,175 B1 | 12/2001 | Chih |
| 6,393,520 B2 | 5/2002 | Yoshikawa et al. |
| 6,412,105 B1 | 6/2002 | Maslennikov |
| 6,430,693 B2 | 8/2002 | Lin |
| 6,446,181 B1 | 9/2002 | Ramagopal et al. |
| 6,529,943 B1 | 3/2003 | Ohi |
| 6,539,543 B1 | 3/2003 | Guffens |
| 6,574,740 B1 | 6/2003 | Odaohhara |
| 6,625,740 B1 | 9/2003 | Datar |
| 6,675,305 B1 | 1/2004 | Mohammad |
| 6,687,838 B2 | 2/2004 | Orenstien et al. |
| 6,795,781 B2 | 9/2004 | Aldridge et al. |
| 6,826,652 B1 | 11/2004 | Chauvel et al. |
| 2001/0044891 A1 | 11/2001 | McGrath et al. |
| 2004/0010679 A1 * | 1/2004 | Moritz et al. ................... 713/1 |
| 2004/0010782 A1 * | 1/2004 | Moritz ....................... 717/151 |
| 2004/0010783 A1 * | 1/2004 | Moritz et al. ............... 717/151 |
| 2004/0205740 A1 * | 10/2004 | Lavery et al. .............. 717/151 |

OTHER PUBLICATIONS

Abraham et al., "Automatic and Efficient Evaluation of Memory Hierarchies for Embedded Systems", *Hewlett–Packard Laboratories*, Palo Alto, CA, (Undated). 12 pages.

Advanced Micro Devices, Inc., "Quantispeed™ Architecture", *AMD White Paper*, Sunnyvale, CA, (2001).

Albonesi et al., "Selective Cache Ways: On–Demand Cache Resource Allocation", *IEEE*, pp. 248–259 (Undated).

(Continued)

*Primary Examiner*—Hiep T. Nguyen
(74) *Attorney, Agent, or Firm*—Fish & Richardson P.C.

(57) ABSTRACT

A processor framework includes a compiler which compiles a computer program, the compiler extracting speculative static information about memory accesses during compilation, and a microarchitecture which performs a memory access using the speculative static information extracted during compiling. An instruction set architecture encodes information about accessing the memory at run time and selects access mechanisms to perform an individual memory access.

48 Claims, 11 Drawing Sheets

OTHER PUBLICATIONS

Anderson et al., "Physical Design of a Fourth–Generation Power GHz Microprocessor", *Digest of Technical Papers, IEEE International Solid–State Circuits Conference;* pp. 232–233 and 451, (2001).

Bahar et al., "Power and Energy Reduction Via Pipeline Balancing", *IEEE,* 12 pgs., (2001).

Baniasadi et al., "Instruction Flow–Based Front–end Throttling for Power–Aware High–Performance Processors", (ISLEPD '01), *ACM,* pp. 16–21, (2001).

Bechade et al., "A 32b 66MHz 1.8W Microprocessor", *Digest of Technical Papers, IEEE,* pp. 208–209, (1994).

Benini, et al., "A Recursive Algorithm for Low–Power Memory Partitioning", (ISLPED'00), *ACM* pp. 78–83 (2000).

Brooks et al., "Wattch: A Framework for Architectural–Level Power Analysis and Optimizations", Proceedings of the 27th International Symposium on Computer Architecture (ISCA '00): *ACM,* pp. 83–94, (2000).

Burger et al., "The SimpleScalar Tool Set, Version 2.0", Computer Sciences Dept., Univ. of Wisconsin–Madison, *Technical Report 1342,* pp. 13–25 (1997).

Buyuktosunoglu et al., "An Adaptive Issue Queue for Reduced Power at High Performance" Power–Aware Computer Systems, First International Workshop, *PACS 2000,* pp. 25–39 (2000).

Calder et al. "Next Cache Line and Set Prediction." Proceedings of the 1995 International Computer Symposium on Computer Architecture, *ACM,* pp. 287–296 (1995).

Calder et al., "Fast & Accurate Instruction Fetch and Branch Prediction", *IEEE,* pp. 2–11 (1994).

Cantin et al., "Cache Performance for Selected SPEC CPU2000 Benchmarks" *Computer Architecture News,* 29(4):13–18 (2001).

Chiou et al., "Application–Specific Memory Management for Embedded Systems Using Software–Controlled Caches", (DAC'00), *ACM,* pp. 416–419 (2000).

Compaq Computer Corporation, "Compiler Writer's Guide for the Alpha 21264", Digital Equipment Corporation © 1999.

Cooper et al., "Compiler–Controlled Memory", ASPLOS VIII; *ACM,* 33(11):2–11 (1998).

Delaluz et al., "Energy–Oriented Compiler Optimizations for Partitioned Memory Architectures", Microsystems Design Laboratory, Pennsylvania State University, University Park, PA, 10 pps., (Undated).

Folegnani et al., "Energy–Effective Issue Logic", *IEEE,* 10 pgs. (2001).

Furber et al., "ARM3–32b RISC Processor with 4 KByte On–Chip Cache", VLSI'89, *Elsevier,* pp. 35–44 (1989).

Furber et al., "Power Saving Features in AMULET2e", Dept. of Computer Science, University of Manchester, UK, 4 pps. (Undated).

Ghiasi et al., "Using IPC Variation in Workloads with Externally Specified Rates to Reduce Power Consumption", Univ. Colorado, Dept. of Computer Science, pp. 1–10 (Undated).

Gowan et al., "Power Considerations in the Design of the Alpha 21264 Microprocessor", (DAC 98), *ACM,* pp. 726–731 (1998).

Harvard University/Michael D. Smith's Research Group on Compilation and Computer Architecture; http:/www.eecs.harvard.edu/hube/software/software.html., 1 page.

Heinrich, J., *MIPS R10000 Microprocessor's User Manual,* 2nd Ed., MIPS Technologies, Inc. (1996).

Heinrich, J., *MIPS R4000 Microprocessor User's Manual,* 2nd Ed., MIPS Technologies, Inc. (1994).

Henry et al., "Circuits for Wide–Window SuperScalar Processors" (ISCA'00), *ACM,* pp. 236–247 (2000).

Hinton et al., "The Microarchitecture of the Pentium 4 Processor", *Intel Technology Journal* Q1, pp. 1–12 (2001).

Huang et al., "L1 Data Cache Decomposition for Energy Efficiency", (ISLPED'01), *ACM,* pp. 10–15 (2001).

Inoue et al., "Way–Predicting Set–Associative Cache for High Performance and Low Energy Consumption", (ISLPED'99), *ACM,* pp. 273–275 (1999).

Intel, "Intel® StrongARM* SA–1110 Microprocessor", *SA–1110 Brief Datasheet,* pp. 1–9 (2000).

International Search Report—PCT/US03/20999.

Jain et al., "A 1.2Ghz Alpha Microprocessor with 44.8GB/s Chip Pin Bandwidth", *IEEE,* pp. 240–241 (2001).

Kaxiras et al., "Cache Decay: Exploiting Generational Behavior to Reduce Cache Leakage Power", *IEEE,* pp. 240–251 (2001).

Kever et al., "A 200MHz RISC Microprocessor with 128kB On–Chip Caches", *IEEE,* pp. 410, 411 and 495 (1997).

Kin et al., "The Filter Cache: An Energy Efficient Memory Structure", *IEEE,* pp. 184–193 (1997).

Kowalczyk et al., "First–Generation MAJC Dual Processor", *IEEE,* pp. 236–237 and 451 (2001).

Kulkarni et al., "Advanced Data Layout Optimization for Multimedia Applications", IMEC, 8 pps. (undated).

Lam et al., "Limits of Control Flow on Parallelism", *ACM,* pp. 46–57 (1992).

Larsen et al., "Exploiting Superword Level Parallelism With Multimedia Instruction Sets", (PLDI'00), *ACM,* pp. 145–156 (2000).

Lee et al., "Region–Based Caching: An Energy–Delay Efficient Memory Architecture for Embedded Processors." (CASES '00) *ACM,* pp. 120–127 (2000).

Lee et al., "MediaBench: A Tool for Evaluating and Synthesizing Multimedia and Communications Systems", UCLA, pp. 330–335 (Undated).

Leenstra et al., "A 1.8 GHz Instruction Buffer", *IEEE,* pp. 314–315 and 459 (2001).

Manne et al., "Pipeline Gating: Speculation Control For Energy Reduction", *IEEE,* pp. 132–141 (1998).

Marculescu, D., "Profile–Driven Code Execution for Low Power Dissipation", (ISPLED'00) *ACM,* pp. 253–255 (2000).

Maro et al., "Dynamically Reconfiguring Processor Resources to Reduce Power Consumption in High–Performance Processors, Workshop on Power–Aware Computer Systems", (PACs '00/LNCS 2008)*ACM,* pp. 97–111 (2001).

Memik et al., "A Selective Hardware/Compiler Approach for Improving Cache Locality", Center for Parallel and Distributed Computing, Northwestern University; pp. 1–21 (Undated).

Michaud et al. "Data–Flow Prescheduling for Large Instructions Windows in Out–of–Order Processors, 7th International", *IEEE,* pp. 2736 (2001).

Milutinovic et al., "The Split Temporal/Spatial Cache: Initial Performance Analysis", Proceedings of the SCIzzL–5, 8 pps. (1996).

Montanaro et al., "A 160 MHz, 32b, 0.5–W CMOS RISC Microprocessor", *IEEE,* 31(11):1703–1714 (1996).

Moritz et al., "Hot Pages: Software Caching for Raw Microprocessors", International Symposium for Computer Architecture (ISCA-27), Massachusetts Institute of Technology, Cambridge, MA, pp. 1-12 (1999).

Moritz et al., "FlexCache: A Framework for Flexible Compiler Generated Data Caching", Umass/MIT, 13 pps. (Undated).

Nicolau et al., "Measuring the Parallelism Available for Very Long Instruction Word Architectures", *IEEE Transactions on Computers*, 33(11):968-976 (1984).

Palacharla et al., "Complexity-Effective Superscalar Processors", (ISCA'97) *ACM*, pp. 206-218 (1997).

Panda et al., "Efficient Utilization of Scratch-Pad Memory in Embedded Processor Applications", *IEEE*, pp. 7-11 (1997).

Parikh et al., "Power Issues Related to Branch Prediction", (HPCA'02) *IEEE*, 12 pgs. (2002).

Pering et al., "Dynamic Voltage Scaling and the Design of a Low-Power Microprocessor System", UC Berkeley, Electronics Research Laboratory, (Undated).

Ponomarev et al., "Reducing Power Requirements of Instruction Scheduling Through Dynamic Allocation of Multiple Datapath Resources", *IEEE*, pp. 90-101 (2001).

Postiff et al., "The Limits of Instruction Level Parallelism In SPEC95 Applications", Adv. Computer Architecture Lab, UMichigan, 10 pgs. (undated).

Powell et al., "Reducing Set-Associative Cache Energy via Way-Prediction and Selective Direct-Mapping", *IEEE*, pp. 54-65 (2001).

Ranganathan et al., "Reconfigurable Caches and their Application to Media Processing", (ISCA'00) *ACM*, pp. 214-224 (2000).

Reinman et al., "An Interated Cache Timing and Power Model", COMPAQ Western Research Lab, pp. 1-20 (1999).

Sair et al., "Memory Behavior of the SPEC2000 Benchmark Suite", IBM T. J. Watson Research Center, pp. 1-8 (undated).

Schlansker et al., "Achieving High Levels of Instruction-Level Parallelism with Reduced Hardware Complexity", Hewlett Packard Laboratories (HP-96-120), pp. 1-85 (1994).

Sohi et al., "Instruction Issue Logic for High-Performance, Interruptable Pipelined Processors", *ACM*, pp. 27-34 (1987).

Stanford University SUIF Compiler Group—http://suif.stanford.edu/.

The Standard Performance Evaluation Corporation, http://www.spec.org, (200 2002).

Tune et al., "Dynamic Predictions of Critical Path Instructions", *IEEE*, pp. 185-195 (2001).

Wall, David W., "Limits of Instruction-Level Parallelism", *ACM*, pp. 176-188 (1991).

Weber "Hammer: The Architecture AMD's of Next-Generation Processors", Microprocessor Forum, (2001).

Wilton et al., "CACTI: An Enhanced Cache Access and Cycle Time Model", *IEEE—Journal of Solid-State Circuits*, 31(5):677-688 (1996).

Witchel, E., "Direct Addressed Caches for Reduced Power Consumption", *IEEE*, pp. 124-133 (2001).

Yang et al., "An Integrated Circuit/Architecture Approach to Reducing Leakage in Deep-Submicron High-Performance I-Caches", *IEEE*, pp. 147-157 (2001).

Zhang et al., "Highly-Associative Caches for Low-Power Processors", *Kool Chips Workshop, 33rd International Symposium on Microarchitecture*, 6 pgs. (2000).

Zyuban et al., "Inherently Lower-Power High-Super-Performance Superscalar Architectures", *IEEE Transactions on Computers*, 50(3):268-285 (2001).

Aragon, et al., "Power-aware Control Speculation Through Selective Throttling," *Proceedings of 9th International Symposium on High Performance Computer Architecture (HPCA)*, 2003.

Ashok, et al., "Coupling Compiler-Enabled and Coventional Memory Accessing for Energy Efficiency," *ACM Transactions on Computer Systems*, 22(2):180-213 (2004).

Unsal, et al., "Cool-Fetch: Compiler-Enabled Power-Aware Fetch Throttling," *IEEE Computer Architecture Letters*, vol. 1, 2002.

Unsal, et al., "Cool-Fetch: A Compiler-Enabled IPC Estimation-Based Framwork for Energy Reduction," *Interact-8*, Feb. 2004.

Unsal, et al., "Cool Cache: A Compiler-Enabled Energy Efficient Data Caching Framework for Embedded/Multimedia Processors," *ACM Transactions on Embedded Computing Systems*, 2(3):373-392 (2003).

Unsal, et al., "An Analysis of Scalar Memory Accesses in Embedded and Multimedia Systems," *High Performance Memory Systems*, Springer-Verlag, 2003.

Unsal, et al., "The Minimax Cache: An Energy Efficient Framework for Media Processors," *IEEE*, pp. 131-140 (2002).

International Search Report for Application PCT/US03/21120, dated Jul. 30, 2004.

* cited by examiner

| | |
|---|---|
| ADPCM | Adaptive differential pulse-coded modulation for audio coding |
| RASTA | Speech recognition front-end processing |
| EPIC | Wavelet decomposition-based Image compression code |
| G721 | Voice compression coder based on the G.711, G.721 and G.723 standards |
| JPEG | Lossy image compression decoder |
| MPEG2 | Lossy motion video compression decoder |
| AMMP | Computational chemistry |
| ART | Neural network for object recognition in a thermal image |
| EQUAKE | Simulation of seismic wave propagation |
| PARSER | Word processing, synthetic English parser |
| VPR | FPGA circuit placement and routing |

Fig. 11

STATICALLY SPECULATIVE MEMORY ACCESSING

FIELD OF THE INVENTION

This invention relates to power and energy consumption in computer systems.

BACKGROUND OF THE INVENTION

Power/energy consumption has increased significantly with every chip generation. With the reduced transistor sizes in modern processors, the per area power density is approaching that of a nuclear reactor. Consequently, power reduction has become a design goal, with power saving features widely recognized as representing the next phase in the advancement of microprocessors. Portability and reliability requirements of emerging applications further underline this trend.

Major processor vendors realize that they must compete in terms of the power consumption of their chips as well as chip speed. Typical approaches to reduce power consumption (e.g., by reducing supply voltage and/or clock rate) negatively impact performance. Other approaches do not scale between design generations (e.g., as clock rates increase, due to changed critical paths, the value of many circuit or microarchitecture based energy reduction approaches is reduced).

The challenge is to reduce the energy consumed in processors without sacrificing performance, and with solutions that scale between processor generations. With increased Internet usage and growing desire for wireless communications, the processor market is being driven to produce smaller and more powerful chips that do not drain significant amounts of power.

SUMMARY OF THE INVENTION

The aforementioned problems are addressed by the present invention. The concepts introduced are broad and present chip-wide energy reduction optimization opportunities. The particular embodiments described provide application adaptive and scalable solutions to energy-reduction in memory systems.

A wide-range of compiler and microarchitectural techniques are presented, that improve the energy efficiency of processors significantly, without affecting performance (in many cases performance can be improved). The scope of the invention includes, but is not limited to, both embedded as well as general-purpose processor designs.

In the methods described, energy consumption is reduced by (1) extracting and exposing static information to control processor resources at runtime, (2) exploiting speculative static information in addition to predictable static information, and (3) adding compiler managed static and static-dynamic execution paths (i.e., architectural components), that can also be integrated into conventional mechanisms and that leverage this static information.

Speculative compiler analysis, as an underlying compilation approach, reduces the complexity of otherwise highly sophisticated analysis techniques (e.g., flow-sensitive and context-sensitive alias analysis), and expands their scope to large and complex applications.

The methods presented are based on a combined compiler-microarchitecture approach, and, more specifically, statically speculative compilation and execution, and provide a unified and scalable framework to reduce energy consumption adaptively, with minimal or no performance impact, or performance improvement for many important applications (e.g., image compression and video processing).

The invention can be used to save energy on any type of device that includes a processor. For example, the invention can be used to save energy on personal computers, devices containing embedded controllers, and hand-held devices, such as PalmPilots and cellular telephones.

In general, in one aspect, the invention is directed to a processor framework that includes a compiler which compiles a computer program, the compiler extracting speculative static information about memory accesses during compilation, and a microarchitecture which performs a memory access using the speculative static information extracted during compiling. This aspect may include one or more of the following features.

The memory in the processor framework may include at least one of a memory hierarchy having at least one layer, and a multi-mechanism associative cache where tag access and way access is not performed and address translation is not performed or is postponed to a low layer in the memory hierarchy. The microarchitecture may access the cache without using a tag memory. Address translation may not be performed or it may be postponed to low layers in the memory hierarchy.

The processor framework may include an instruction set architecture to encode information about accessing the memory at run time and to select access mechanisms to perform an individual memory access. The microarchitecture may perform a protection check for the memory access. Protection checking information for performing the protection check may be incorporated in one or more tags.

The microarchitecture may access the memory using a tag memory. The tag may contain support for performing a protection check for the memory access. The microarchitecture may access the memory without using a TLB. The compiler may dictate a first mechanism for the microarchitecture to use to access the memory and run-time events dictate a second mechanism for the microarchitecture to use to access the memory. The first and second mechanisms may be used in combination. The compiler may encode information relating to at least some address translations between logical memory block addresses and physical cache block addresses. The compiler may identify memory accesses that are at least likely to go to a cache line, a cache block, a cache way, a cache set, and a cache bank.

The microarchitecture may verify a correctness of the speculative static information and may provide a mechanism to recover in a case of misprediction. The compiler may perform different levels of speculation to extract different levels of speculative static information. One of the levels of speculative static information may be selected for use by the microarchitecture.

The processor framework may include a memory hierarchy having at least one level. The memory access may include an access into the memory hierarchy. The processor framework may include a virtual-virtual memory architecture, and a virtual-physical memory architecture. The processor may also include a translation buffer or executable instructions (i.e., software) for performing the memory translation. Virtual memory related address translation may be performed following an L1 cache or following an L2 cache, is supported by all access mechanisms, and may be performed by using translation buffers and/or software methods that can be integrated with statically driven memory access mechanisms.

In the processor framework, address space identifiers may be added on all memory access paths. The memory may be a cache and the microarchitecture may access the cache a number of times without using tags. The memory may be a register and the microarchitecture may access the register without using a way access. The memory may be a random access memory and the microarchitecture may access the memory without using a way access.

In general, in another aspect, the invention is directed to a processor framework including a compiler which (i) extracts memory access information speculatively and (ii) determines which of plural memory access mechanisms to use for a memory access based on the extracted memory access information. This aspect may include one or more of the following features.

The compiler may perform an analysis related to a register access mechanism that is used at run time to direct accesses to a cache. The analysis may assign program variable names to a different register starting with a first register and wraps around back to the first register. The analysis may determine which program variable to assign to which of plural registers. The analysis may take into account one or more of program variable type, distance, dependence, and an alias analysis. The analysis may include evaluating a distance between information relating to program variables and determining when the distance is larger than a predetermined threshold, and assigning a program variable to another register when the distance is larger than the predetermined threshold. A same register may be used for different memory accesses and the analysis may be set to reuse the same register.

A frequency at which the register is reused may be based on the memory access information. The compiler may perform dependence testing, control-flow analysis, and data-flow analysis driven by a likelihood of correctness of information at any point in the analysis.

In general, in another aspect, the invention is directed to a compiler which performs a speculative alias analysis (SAA) to extract speculative static information during compiling of a pointer-based computer program. The speculative alias analysis ignores unlikely values for a pointer and adding likely values for the pointer. This aspect may include one or more of the following features.

The SAA analysis may be context-sensitive and flow-sensitive. The SAA analysis may be either context-sensitive, flow-sensitive, non-context-sensitive, or non-flow-sensitive. The SAA analysis may handle pointer-based calls, recursion, and/or library calls in the computer program. The compiler may apply the SAA analysis to only a portion of the computer program. The compiler may apply the SAA analysis to source code that contains a precompiled static library.

The SAA analysis may be used to information relating to pointer values. The SAA analysis may determine when loop iterations in the computer program are independent in a presence of loop carried dependencies. The compiler may use the SAA analysis in compiler-managed memory dependence speculation. The compiler may use the SAA analysis in a speculative parallelization technique.

The SAA analysis may take into account strength of each point-to-relation in a point-to graph, where strength is determined by a criticality of code in the computer program. The compiler may make a strength of a point-to relation weaker if the point-to relation comes from an outer loop nest in the computer program. The SAA analysis may include at least one of an inter-procedural and intra-procedural analysis. The SAA analysis may be stopped after a fixed number of steps.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In addition, the materials, methods, and examples are illustrative only and not intended to be limiting.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 11 is a list of programs evaluated with the embodiments described herein.

DETAILED DESCRIPTION

Figure 1:
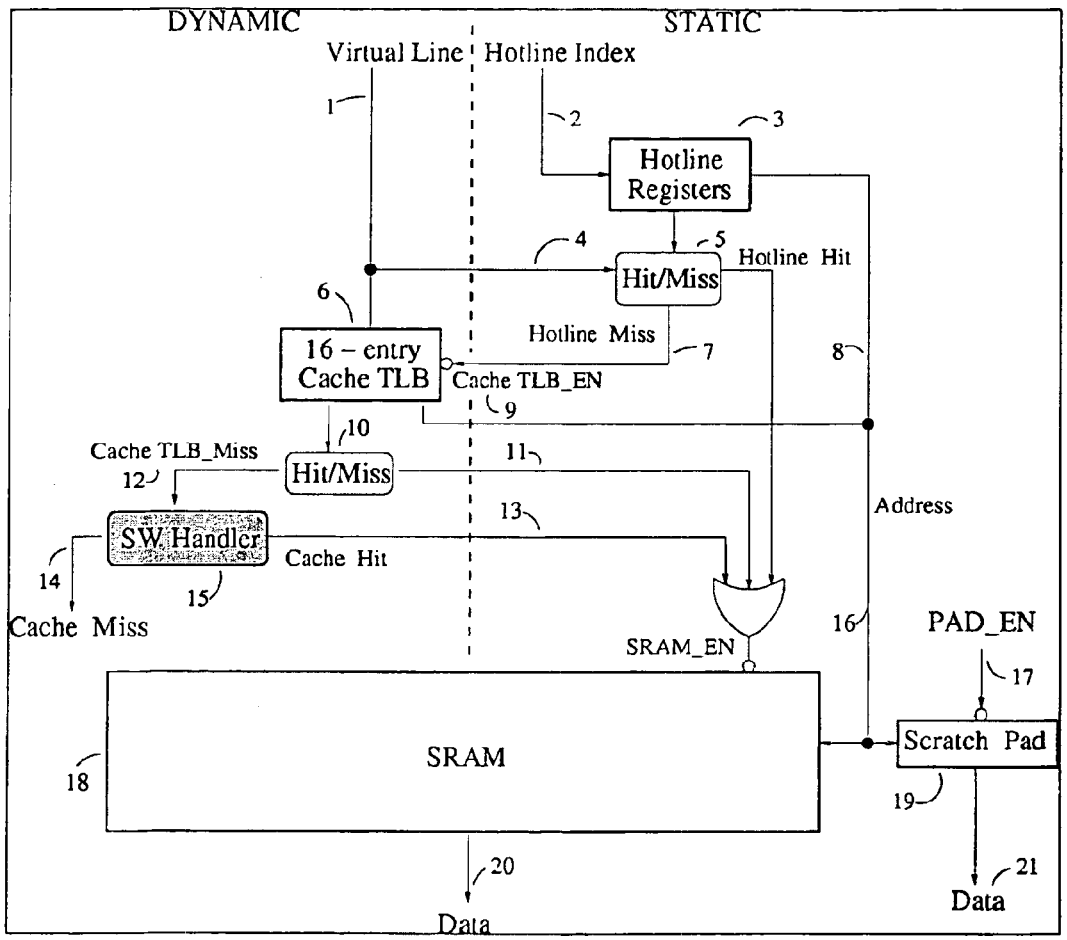
FIG. 1 is a block diagram showing a Tag-less (tagless) Cache architecture, which is an example implementation of the microarchitecture described in the first embodiment.

The problem of energy reduction without performance impact is addressed by the present invention. Power and energy consumption are reduced by methods incorporated at compile-time and at runtime, in both hardware and software layers. The methods include compiler level, instruction set architecture (ISA), and micro-architectural components/techniques.

A compiler is software (i.e., machine executable instructions stored in a memory system) that translates applications from high-level programming languages (e.g., C, C++, Java)

into machine specific sequences of instructions. The ISA is a set of rules that defines the encoding of operations into machine specific instructions. A program is a collection of machine level instructions that are executed to perform the desired functionality. Micro-architectural (or architectural) components refer to hardware and/or software techniques that are used during execution of the program. The actual machine can be a microprocessor or any other device that is capable of executing instructions that conform to the encoding defined in the ISA. A memory area can be any area that can store bits, e.g., registers, cache, and some type Random Access Memory (RAM).

Compile-time refers to the time during which the program is translated from a high level programming language into a machine specific stream of instructions, and it is not part of the execution or runtime. Runtime is the time it takes to execute the translated machine instructions on the machine. Machine energy in the targeted apparatus is only consumed during runtime. Compilation is typically done on a different host machine.

Information in the context of this invention refers to either information collected during compilation or during execution. Information collected during compilation is called static or compile time information. Information collected during runtime is called runtime or dynamic information. Program analysis refers to the process during compile time that analyzes the program and extracts static information. Program transformation/optimization is the process during compile time that modifies the program typically to achieve some objective such as improve performance.

Static information is defined to be predictable if it can be shown during compilation that the information is true for any possible input set applied to the program, or for any possible execution of the program on the machine in question. Static information is defined to be speculative if the information extracted during compile time is not shown or cannot be shown to be true for all possible execution instances. As such, the available (i.e., extractable) speculative static information is a superset of the available predictable static information in a program.

An energy optimization is called dynamic if it uses dynamic information. It is called static if it uses static information.

The methods described herein address opportunities that appear at the boundary between compile-time and runtime layers in computer systems, in addition to techniques that can be isolated to be part of either compile-time or runtime components. The methods combine architecture and compiler techniques into a compiler-enabled, tightly integrated, compiler-architecture based system design. The approach is called compiler-enabled if the execution of specific instructions is managed to some extent by static information.

This has the benefit of that in addition to dynamic techniques, static and static-dynamic energy reduction optimizations can be enabled. Additionally, the information exposed to runtime layers can be made available much earlier in the processor execution (pipeline), enabling energy reduction without negatively impacting execution latencies.

In general, there are two main ways the methods presented herein achieve energy reduction, without significantly affecting performance (for several applications studied performance has been improved): (1) redundancies in instruction executions are either eliminated or reduced, and (2) execution paths are simplified based on modified and/or new micro-architectural components. In both (1) and (2) the methods are leveraging various type of static information and/or dynamic information about resources used and/or resources (likely) needed, and/or information that can be used to estimate the resources likely to be used.

The methods leverage static program information in smart ways, and expose static resource utilization information for a particular application, to runtime layers. The apparatus extracts and leverages this information in a speculative manner, in both compiler and architecture components, i.e., in the new methods a superset of the predictable program information can be used.

The methods implement compiler analysis and micro-architectural techniques that enable the extraction and utilization of speculative static information without affecting correctness of execution. The methods also enable various degrees of static speculation (i.e., the extent to which information extracted is expected to be true during execution), to control the accuracy of static speculation.

Static speculation can be controlled on an application specific/adaptive basis and managed with compile-time flags. This provides unique post-fabrication (compile-time) customization of design objectives, as the type of information extracted and leveraged can be used to control tradeoffs between various design objectives such as power, performance, and predictability, without requiring changes in the architecture.

Additionally, the static speculation based approach is or can be combined with dynamic techniques, in a solution that leverages both statically predictable, statically speculative, and dynamic information.

Rather than extracting only predictable information, that would require a conservative compilation approach, the new methods extract speculative static information. Such information, that is likely to be true for the typical execution instance, provides a larger scope for optimizations. The information is leveraged speculatively and supported with micro-architectural techniques to provide correctness of execution.

In addition to enabling extraction of more program information, the methods also increase the flow of information between compile-time and runtime layers/optimizations, by exposing the speculative static information to runtime layers.

The methods encode statically extracted information about predicted resource utilization into the Instruction Set Architecture (ISA), so that this information can be leveraged at runtime. This approach enables a more energy-efficient execution if used together with micro-architectural components.

The methods can be used to reduce power and energy consumption in both embedded and general-purpose systems. Furthermore, the methods are applicable to a wide-range of computer systems, both state-of-the-art and emerging, which build on ISA interfaces between hardware and compilation layers. The methods are independent from device level technology, and can be used to reduce energy consumption in both silicon based (e.g., CMOS) and emerging nano electronics based (e.g., carbon nano tubes, nano wires, quantum dots) systems.

Memory Systems

The presented embodiment relates to the cache and memory system mechanisms. Nevertheless, other embodiments, on the same principles of statically speculative execution and compilation, can be constructed.

Background on Memory Systems

The cache is a fast memory hierarchy layer, typically smaller in size than the physical address space. It is one of the cornerstones of computer systems, used to hide the latency of main memory accessing. This is especially important, due to the increasing gap between execution speeds and memory latency. While execution speeds are known to double every 18 months (Moore's law), memory latencies are improving at a much lower rate. With the increasing cache sizes, necessary to hide memory latencies, the energy impact of cache accesses becomes even more significant in future generation designs.

Every instruction is fetched from the memory hierarchy. Approximately 20–25% of the program instructions are data memory accesses that are fetched from a layer in the (data) memory hierarchy. Hence, memory accessing (instructions and data related) accounts for a large fraction of the total processor energy.

As caches are typically smaller in size than the main physical memory, not all memory accesses may be cached (i.e., found in the cache) at a given time. Fast lookup and detection, of whether a memory access is cached or not, in caches, is provided through associative search mechanisms and matching of tag information associated with data blocks.

Conventional caches consist of a tag memory and a data-array. The data array is where the actual information is stored. The tag memory is storing additional information related to blocks of data (also called cache blocks or cache lines) in the data-array. The tag information can be imagined as a label that identifies a block of data in the cache. Every memory access has this kind of label associated, as part of its address. The tag extracted from the address is compared with labels in the tag-memory, during a memory access, to identify and validate the location of a data block in the data-array.

If there is a tag that matches the current memory tag, then the access results in a cache-hit and can be satisfied from the cache data-array. If there is no tag in the tag-memory that matches the current tag then the access is a cache-miss (at this level at least) and the memory access needs to be resolved from the next layer in the memory hierarchy.

In associative caches multiple ways (i.e., alternative locations) are looked up in both tag memory and data-array.

Different systems have different organizations for memory hierarchies. Some systems have only one layer of cache before the main memory system, others have multiple layers, each increasingly larger (and slower typically) but still much faster than the main memory. Additionally, a memory system can have additional roles as described next.

The broader memory system may include additional mechanisms such as address translation, Translation Lookahead Buffer (TLB), virtualization, protection, and various layers and organizations of memory. Address translation is the mechanism of mapping logical addresses into physical addresses. Logical addresses are typically the addresses that appear on the address pins of the processor, while the physical addresses are those that are used on the actual memory chips.

Virtualization is the mechanism that enables a program compiled to run on machines with different memory system organizations. Protection is a mechanism that guarantees that memory accesses are protected against writing into unauthorized memory areas.

Approach in Memory Systems

The main components in the methods to reduce energy consumption in the memory system are: (1) compiler techniques to extract/leverage static information about memory accessing and data-flow, (2) tag-less and way-predictive compiler-enabled cache architecture based on speculative memory accessing, (3) methodology to interface and integrate the new methods into conventional memory hierarchies and combine static and dynamic optimizations, and (4) ISA extensions to expose memory accessing information.

The remaining structure of this description is as follows. Next, two embodiments are introduced. First, the architecture of the Tag-less compiler-enabled cache and related compiler technology are presented. Then, a memory system that combines statically managed memory accessing with conventional memory accessing, a tagged statically speculative cache, the ISA extension, and an embodiment of the compiler technology are described.

Embodiments

Two implementation examples are presented, for the purpose of illustrating possible applications of the statically speculative execution and compilation methods in memory systems.

The first embodiment is a Tag-less cache that can be integrated with other performance and energy reduction mechanisms. This scheme is especially attractive in embedded processors due to its low-cost, high-performance, low-power consumption as well as adaptivity to different application domains.

The second implementation is an embodiment in multi-level memory hierarchies. It shows how the method of statically speculative execution and compilation can be integrated in multi-level memory hierarchies. It provides the necessary compilation and architecture techniques for such integration. The methods are applicable, but not restricted to, both embedded and general-purpose domains.

$1^{st}$ Embodiment: Tag-less Cache Architecture

This section describes an energy-efficient compiler-managed caching architecture, that has no tag memory and utilizes speculative static information. The architecture is shown in FIG. 1.

Its main components are: Hotlines Register File 3, Cache TLB (Translation Lookahead Buffer) 6, Hotlines Check 5, SRAM Memory 18, Scratchpad Memory 19, and Software (SW) Handler 15. The arrows represent signals or flow in execution that are required for explanation: Virtual Line 1, Hotline Index 2, Result of Cache TLB lookup 10, Cache TLB Miss signal 12, Hotline Register Hit/Miss result 5, Hotline Miss 7, Hotline Hit 8, Address from cache TLB 9, Cache TLB Hit 11, Software Handler Cache Hit 13, Address 16, Enable to Scratchpad 17, Software Handler Detected Cache Miss 14, Data output from SRAM 20, and Data output from scratchpad 21.

In this following explanation a design example where scalar accesses are mapped to the scratchpad 17 and the non-scalars to memory 18 is assumed. This however is not necessary; another application of this architecture is to map all the memory accesses to either the hotlines or the conventional paths. Other memory accessing techniques could also be combined with the ones described here.

The scratchpad access mechanism consumes very low power due to its small size (a 1 Kbytes memory is used, but this can be a banked memory where the actual use is application specific controlled by the compiler). All accesses directed to the scratchpad 17 are then output on 15, being enabled by signal 12 decoded from the memory instruction.

The memory instructions that are using the hotline path carry a hotline index 2 that has been determined at compile time. This identifies the hotline register from register file 3, predicted by the compiler to contain the address translation for the current memory access. Using this index 2, the corresponding hotline register is read from the hotline register file 3. A hotline register file is similar to a general purpose register file, but contains register promoted cache pointers instead of operands. In addition to the statically indexed mode, an associative lookup can also be implemented to speed up access during replacement.

The hotline register contains the virtual cache line address to SRAM line address 16 mapping. If the memory reference has the same virtual line address as that contained in the hotline register during the Hotlines Check 5 (i.e., correctly predicted speculative static information), there is a Hotline hit 8. Upon a correct static prediction, the SRAM can be accessed through the SRAM address 16; this address is from the hotline register that is combined with the offset part of the actual address, and the memory access is satisfied. The offset is the part of the address used to identify the word within a cache line. If there is a static misprediction (i.e., the memory access has been encoded at compile-time with an index that points at runtime to a hotline register that does not contain the right translation information) that causes a Hotline Miss 4, the cache TLB 6 is checked for the translation information.

If the cache TLB 6 hits or signal 11 is set, the hotline register file 3 is updated with the new translation, and the memory access is satisfied from the SRAM memory 18. Data is output on 20. A Cache TLB miss 12 invokes a compiler generated software handler 15 to perform the address translation. This handler checks the tag-directory (which itself can be stored in a non-mapped portion of the memory) to check if it is a cache miss 14.

On a miss 14, a line is selected for replacement and the required line is brought into its place—pretty much what happens in a hardware cache, but handled by software here. The cache TLB 6 and the hotline register 3 are updated with the new translation, and the memory access is satisfied by accessing the SRAM memory 18 and outputting the data on 20.

Because the software handler 15 is accessed so seldom, its overhead has minimal effect on the overall performance. This cache can, in fact, even surpass a regular hardware cache in terms of performance. For one, the interference between memory accesses mapped to different paths has been eliminated resulting in better hit-rate, and better cache utilization.

Secondly, a high associativity is basically emulated, without the disadvantage of the added access latency in regular associative caches, where higher associativity increases cache access times. Since the SRAM access mechanism is much less complicated than a regular tagged hardware cache, there is a possibility of reduction in cycle time.

Additionally, both the hotline path (i.e., 2, 3, 5, 7) and the scratchpad path (i.e., 17, 19, 21) will have a smaller hit latency than in a conventional cache. This latency (in conventional caches) would be even larger if runtime information is used to predict way accesses. Furthermore, an optimal line size can be chosen on a per application basis, as the line here is not fixed but it is based on a compiler determined (logical) mapping.

Access Mechanisms

This cache architecture combines four cache control techniques: (1) fully static through 19, (2) statically speculative through 2, 3, (3) hardware supported dynamic 6, and (4) software supported dynamic through the software handler 15. FIG. 1 shows this partitioning with the dotted line. To the left the architectural mechanisms implement dynamic control, to the right, static control.

The fully static cache management is based on disambiguation between accesses with small memory footprints such as the scalars and other memory accesses. Furthermore, frequently accessed memory references that have a small footprint can be mapped into the scratchpad area. This architecture can also be used without the scratchpad memory, by having all memory accesses mapped either through the statically speculative techniques or some other path.

The second technique in this architecture is based on a compile time speculative approach to eliminate tag-lookup and multiple cache way access. In addition, some of the cache logic found in associative caches can also be eliminated. The idea is that if a large percentage of cache accesses can be predicted statically, it is possible to eliminate the tag-array and the cache logic found in associative caches, and thus reduce power consumption.

The accesses that are directly mapped to the scratchpad memory require no additional runtime overhead. The statically speculative accesses however, if managed explicitly in the compiler, use virtual to SRAM address mappings or translations at runtime. This mapping is basically a translation of virtual cache line block addresses into SRAM cache lines, based on the line sizes assumed in the compiler.

Note that the partitioning of the SRAM into lines is only logical, the SRAM is mainly accessed at the word level, except for during fills associated with cache misses. Inserting a sequence of compiler-generated instructions, at the expense of added software overhead, can do this translation. For many applications there is a lot of reuse of these address mappings. The compiler can speculatively register-promote the most recent translations into a small new register area—the hotline register file. With special memory instructions, or other type of encoding of this information, the runtime overhead of speculation checking can be completely eliminated. Nevertheless, in simple designs a software based check that can be implemented in four regular instructions is also possible.

To avoid paying the penalty during a statically miss-predicted access, a small fully associative Cache TLB 6 is used to cache address mappings for memory accesses that are miss-predicted. A 16-entry Cache TLB 6 is enough to catch most of the address translations that are not predicted correctly statically. Different application domains may work fine with a smaller or require a slightly larger size for optimum energy savings.

The fourth technique used in this architecture, is basically a fully reconfigurable software cache 15. This technique is a backup solution, and it can implement a highly associative mapping. This implementation is for example based on a four-way associative cache. The mapping table between virtual cache lines 1 and physical SRAM lines 16 can be implemented similar to an inverted page table or other schemes. Experimental results show that the combined static and cache TLB techniques often capture/predict correctly more than 99% of the memory accesses.

From a power perspective, this cache has substantial gains compared to a conventional hardware cache for two reasons. First, there are no tag-lookups on scalar accesses and correctly predicted non-scalar accesses. Second, the SRAM is used as a simple addressable memory—the complicated access mechanisms of a regular cache consume more power and increase the memory access latency (e.g., the hit-latency).

$2^{nd}$ Embodiment: Statically Speculative Memory Accessing in Conventional Memory Systems In general there are two main steps involved in a memory access: (1) converting the program address to a cache address, and (2) accessing the data from this address, if present in cache (accessing the slower memory such as DRAM if not present). Depending on the implementation, there can be considerable power/performance redundancy associated with both of these steps. This redundancy problem is described in the next subsection, following with implementation embodiments to tackle this problem. The invention is not limited to these embodiments.

Figure 3:
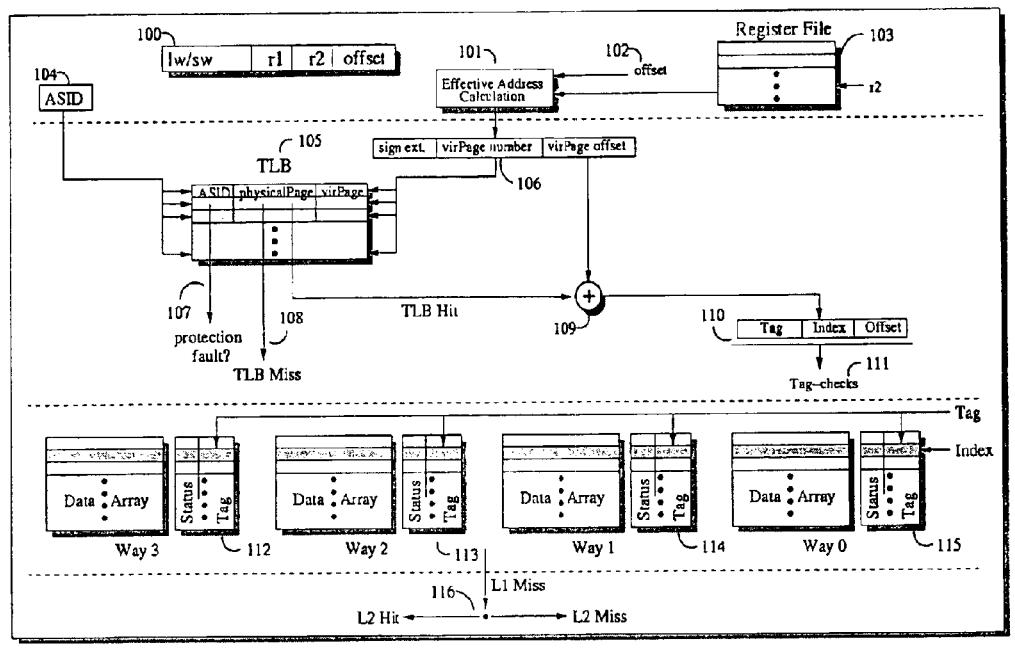
FIG. 3 is a block diagram of a baseline memory system, where all accesses require address translation, multi-way cache access, and tag-checks.

FIG. 3 shows the memory access process. The translation function translates the larger program address 100 into a cache block address shown as part of 110 (the lower order block offset bits in 100 do not undergo any translation).

Depending on the caching scheme, this translation can be very expensive, both energy-wise (for example, on a virtual memory system with a 4-way cache, the virtual address 100 will be converted to physical address by the TLB 105, and all the 4 tag and data arrays 112, 113, 114, 115 would be looked up in parallel), and performance-wise (if the cache is software managed, doing the translation in software will consume valuable CPU cycles). The translation information 109 in case of a TLB hit 108 is added with the offset to form address 110 that is used to access the cache.

Where is the redundancy? Looking at a cache block level, two program addresses with the same virtual block address map to the same cache block. Therefore, the second translation is redundant. In general, if there is a group of memory accesses mapping to the same cache block, repeating the translation process on each access can be wasteful. Additionally, if the cache way for the access is known, looking up all the four ways (e.g., way 3 112, way 2 113, way 1 114) is not necessary. Furthermore, the tag lookup 111 is wasteful if the tag has been checked for an earlier access in the same cache block.

The usual implementation maps all the accesses to the same cache. This scheme may also be extravagant: many applications often exhibit the behavior where a small set of references are accessed very often—these can be accommodated in a small partition of the cache which consumes much less power. Therefore, partitioning the cache and devising a wiser translation function, which maps different accesses to different cache partitions depending on their access pattern, can amount to sizable energy savings.

The aforementioned redundancies are tackled using a cooperative compiler-architecture approach. Specifically, compiler analysis techniques that identify accesses likely to map to the same cache line are developed. These accesses can avoid repeated translation to save energy. The compiler in the proposed method speculatively register promotes the translations for such groups of accesses.

These registers that contain address translation information are provided as a form of architectural support. At runtime, the architecture is responsible for verifying static speculations: if correctly predicted by the compiler, the expensive translation is eliminated. On mispredictions, the architecture can update the registers with new information. Further, the level of speculation in the compiler can be varied to better match application behavior. Henceforth, the solution proposed is referred to as the microarchitecture in $2^{nd}$ embodiment.

Conventional general-purpose microprocessors use a one-size-fits-all access mechanism for all accesses. The subject architecture in the $2^{nd}$ embodiment derives its energy savings by providing different energy-efficient access paths that are compiler-matched to different types of accesses. Next an overview of the subject architecture in the $2^{nd}$ embodiment is presented and followed with detailed discussions on the features of this architecture.

Two different organizations of the architecture in the $2^{nd}$ embodiment are shown. In both organizations a virtually-indexed and virtually-tagged first level cache is used and address translation is moved to lower levels in the memory hierarchy. Other type of cache organizations are also possible. As second level or L2 cache, both a physically-indexed and a virtually-indexed cache are shown. Some of the design challenges in virtual-virtual organizations (e.g., the synonym problem, integration in bus based multiprocessor systems, and context-switching with large virtual L2 caches) could be handled easier in virtual-physical designs. In both organizations, translation buffers are added. A translation buffer is a cache for page level address translations and is used to avoid the more expensive page table lookup in virtual memory systems.

In the virtual-virtual (v—v) organization, a translation buffer (MTLB) is added after the L2 cache and is accessed for every L2 cache miss. This serves better the energy optimization objectives than a TLB-less design, where address translation is implemented in software. Nevertheless, if increased flexibility is desired, in the way paging is implemented in the operating system, the TLB-less design is a reasonable option (experimental results prove this point). In the virtual-physical organization (v–r), a translation buffer (STLB) is added after the L1 cache and is accessed for every L1 cache miss or every L2 cache access.

Figure 2:
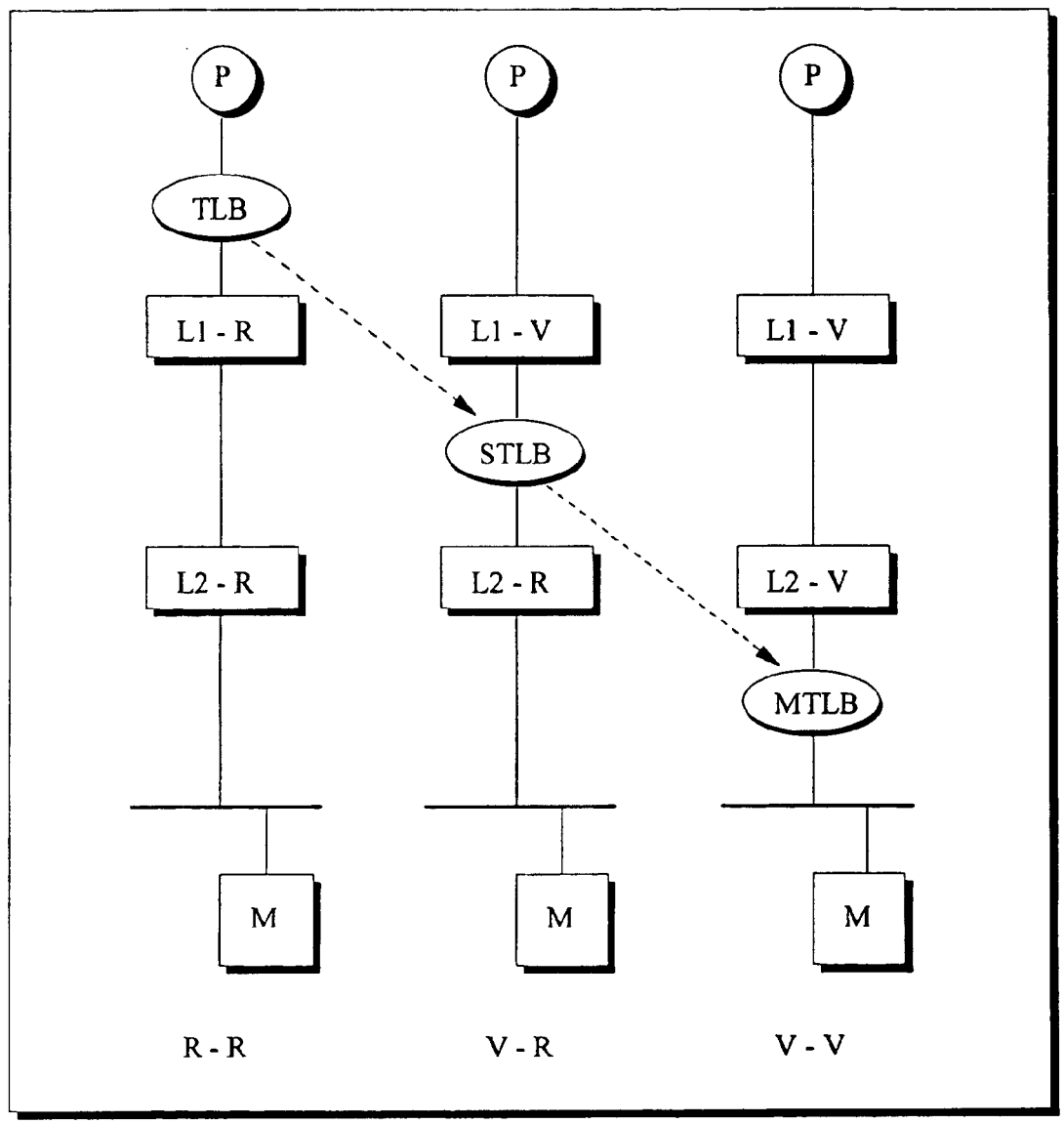
FIG. 2 is a block diagram of cache organizations with address translation moved towards lower levels in the memory hierarchy, STLB is the translation buffer between L1 and L2 caches, and MTLB is the translation buffer added between L2 cache and main memory.

An overview of the different cache organizations with address translation moved towards lower levels in the cache hierarchy is shown in FIG. 2. As address translation consumes a significant fraction of the energy consumed in the memory system, both the v—v and v–r designs will save energy compared to a physical-physical (r—r) cache hierarchy, where virtual-to-physical address translation is done for every memory access.

A context-switch between threads belonging to different tasks may require change in virtual address mappings. To avoid flushing the TLBs address-space identifiers to TLB entries are added. Note that not having the address-space identifiers not only would require flushing all the TLB entries, but would also imply that the newly scheduled thread, once it starts executing, will experience a number of TLB misses until its working set is mapped.

Figure 4:
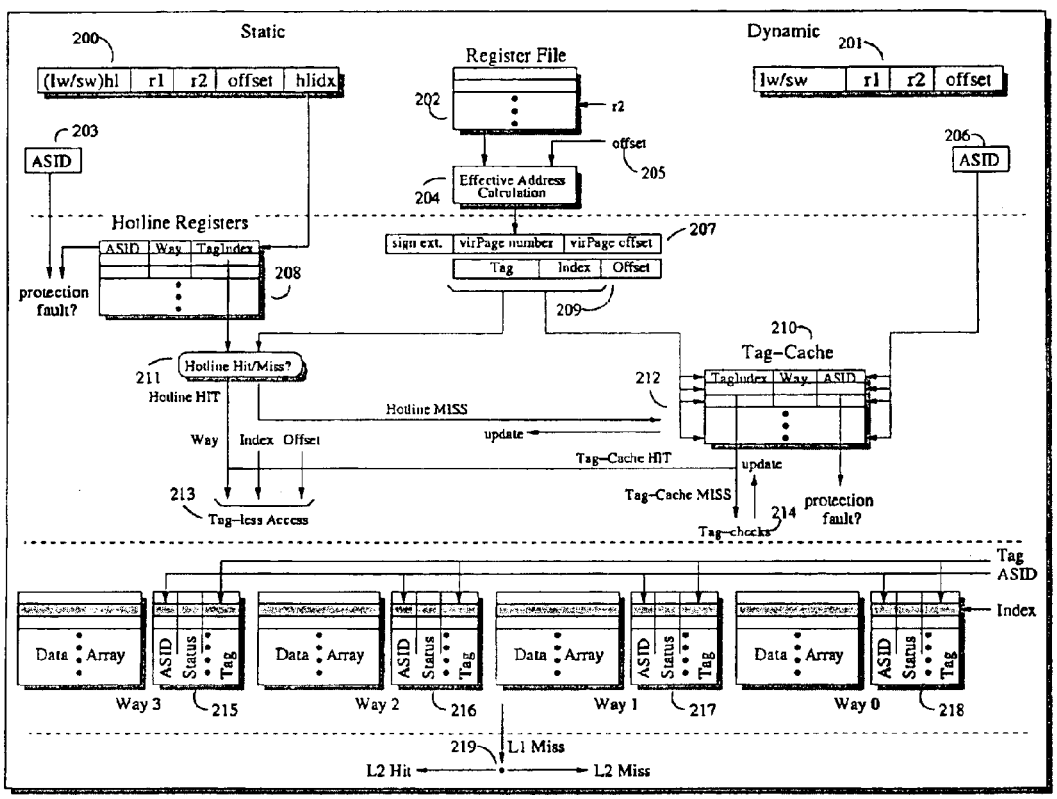
FIG. 4 is a block diagram showing an example of implementation of the microarchitecture in the $2^{nd}$ embodiment.

FIG. 4 presents an overview of the subject architecture in the $2^{nd}$ embodiment memory system, with integrated static 200 and dynamic 201 access paths. The subject architecture in the 2nd embodiment extends associative cache lookup mechanism 215, 216, 217, 218, with simpler, direct addressing modes 213, in a virtually tagged and indexed cache organization. This direct addressing mechanism 213 eliminates the associative tag-checks (i.e., no tag-lookup as shown in 215, 216, 217, 218 is required) and data-array accesses (i.e., only one of the data-arrays from 215, 216, 217, 218 is accessed). The compiler-managed speculative direct addressing mechanism uses the hotline registers 208. Static mispredictions are directed to the CAM based Tag-Cache 210, a structure storing cache line addresses for the most recently accessed cache lines. Tag-Cache hits also directly address the cache, and the conventional associative lookup mechanism is used only on Tag-Cache misses. Integration of protection-checks along all cache access paths (208, 210 and conventional) enables moving address translation to lower levels in the memory hierarchy, as described earlier, or TLB-less operation. In case of TLB-less designs, an L2 cache miss requires virtual-to-physical address translation for accessing the main memory; a software virtual memory exception handler can do the needful.

Support for Moving the TLB to Lower Levels in the Memory Hierarchy or TLB-less Operation The subject architecture in the 2nd embodiment employs virtually addressed caches, and integrates support for protection checks, otherwise performed by the TLB, along all access mechanisms. That is, the subject architecture in the 2nd embodiment has embedded protection checks in the Hotline registers 208, the Tag-Cache 210, and cache tags (shown as part of 215, 216, 217, 218). The subject architecture in the 2nd embodiment therefore could completely dispense with the TLB.

L2 cache misses in the v—v organization require address translation for the main memory access. The subject architecture in the 2nd embodiment uses translation buffer to speed up this address translation, but a software VM exception handler for doing the translation on L2 cache misses and fetching the data from the main memory can also be used.

The statically speculative, compiler managed memory accessing can also be integrated in other type of memory hierarchies.

Hotline Registers

The conventional associative lookup approach 4 parallel tag-checks and data-array accesses (in a 4-way cache). Depending on the matching tag, one of the 4 cache lines is selected and the rest discarded. Now for sequences of accesses mapping to the same cache line, the conventional mechanism is highly redundant: the same cache line and tag match on each access. The subject architecture in the 2nd embodiment reduces this redundancy by identifying at compile-time, accesses likely to lie in the same cache line, and mapping them speculatively through one of the hotline registers 208.

The condition that the hotline path evaluates can be done very efficiently without carry propagation. The hotline cache access can also be started in parallel with the check, with the consequence that in case of incorrect prediction some additional power is consumed in the data-array decoder. As a result, the primary source of latency for hotline based accesses, is due to the data array access and the delay through the sense amps. Note that conventional associative cache designs use an additional multiplexer stage to select between ways in a multi-way access (i.e., the correct block from the ways 215, 216, 217, 218). Furthermore, as shown in previous cache designs, the critical path is typically the tag-path; the tag latency can be as much as 30% larger than the latency of the data-array path in the conventional design.

Reduced feature sizes in next generation architectures will further accentuate the latency increase of the tag path. Because of this, in conventional cache designs, the way-selection logic is moved towards the tag to rebalance the delay differences between the tag and data-array paths. In the subject architecture in the 2nd embodiment the latency of the data-array could be the main target for optimizations, as the tag path is not on the critical path for most of the memory accesses, by adequate bitline and wordline partitioning. Additionally, as physical cache designs would require the TLB access completed to perform the tag comparison (the tag access could be however done in parallel), this may also add to the tag path latency. As such, the subject architecture in the 2nd embodiment based microprocessor could either have a faster clock or at least a faster cache access for statically predicted cache accesses.

The different hotline compiler techniques are described in the next section. A simple run-time comparison 211 reveals if the static prediction is correct. The cache is directly accessed on correct predictions 213, and the hotline register 208 updated with the new information on mispredictions. A fully associative lookup on the hotline registers to support invalidations is included.

Figure 6:
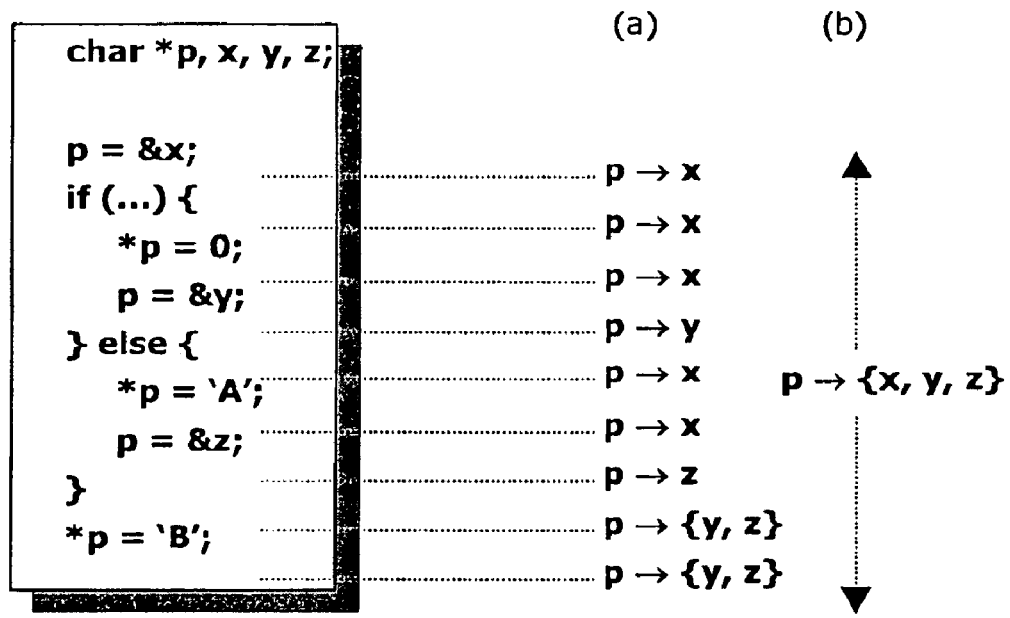
FIG. 6 is a diagram for alternative pointer representations: (a) program-point representation, (b) through global information.

As shown in FIG. 6, a hotline register 208 has 3 components: (1) protection bits (ASID), which are used to enforce address space protection, (2) TagIndex—two accesses are to the same cache line if their Tag and Index components are the same. The TagIndex component is compared with Tag and Index of the actual access to check if the hotline register can indeed be used to directly address the cache, (3) cache-way information—this information enables direct access to one of the ways in the set-associative cache.

Tag-cache

Another energy-efficient cache access path in the subject architecture in the 2nd embodiment is the Tag-Cache 210. It is used both for static mispredictions (hotline misses 212) and accesses not mapped through the hotline registers, i.e., dynamic accesses 201. Hence it serves the dual-role of complementing the compiler-mapped static accesses by storing cache-line addresses recently replaced from the hotline registers, and also saving cache energy for dynamic accesses; the cache is directly accessed on Tag-Cache hits 211, 213.

A miss in the Tag-Cache 210 implies that associative lookup mechanism is used with an additional cycle performance overhead. The Tag-Cache is also updated with the new information on misses, in for example LRU fashion. As seen in FIG. 4, each Tag-Cache 210 entry is exactly the same as a hotline register 208, and performs the same functions, but dynamically.

Associative Lookup

The subject architecture in the 2nd embodiment uses an associative cache lookup that is different from the conventional lookup in that the protection information (ASID) is also tagged to each cache line. Even the virtually addressed L2 cache is tagged with protection information in the v-v design to enable TLB-less L2 access. This increases the area occupied by the tag-arrays, and also its power consumption. Compared to the overall cache area and energy consumption, this increase is however negligible.

Instruction Set Architecture (ISA) Support

To access the memory through the hotline registers, memory operations 200 that encode the hotline register index should be provided. This index is filled in during compile time based on the techniques described in the compiler section. The implementation should perform a simple check 211 between the content of the hotline register identified and the actual virtual block address, as shown in FIG. 4. Special instructions, rather than modifications to existing can also be provided for example. Alternatively, techniques requiring no ISA modifications could also be used, as shown in the section. The invention is not limited to type of encodings described herein.

Approach Not Requiring ISA Support

Static information about the hotline registers 208 accessed could be provided by generating code that writes this into predetermined memory locations, e.g., into a stream-buffer. This buffer can be used to add the index at runtime to memory accesses in the critical path. For example, memory accesses that are identified in critical loops could use the index information from this buffer during the Instruction Decode stage to access the hotline registers. The invention is not limited to type of encodings described herein.

An Embodiment of the Compilation Process

Figure 5:
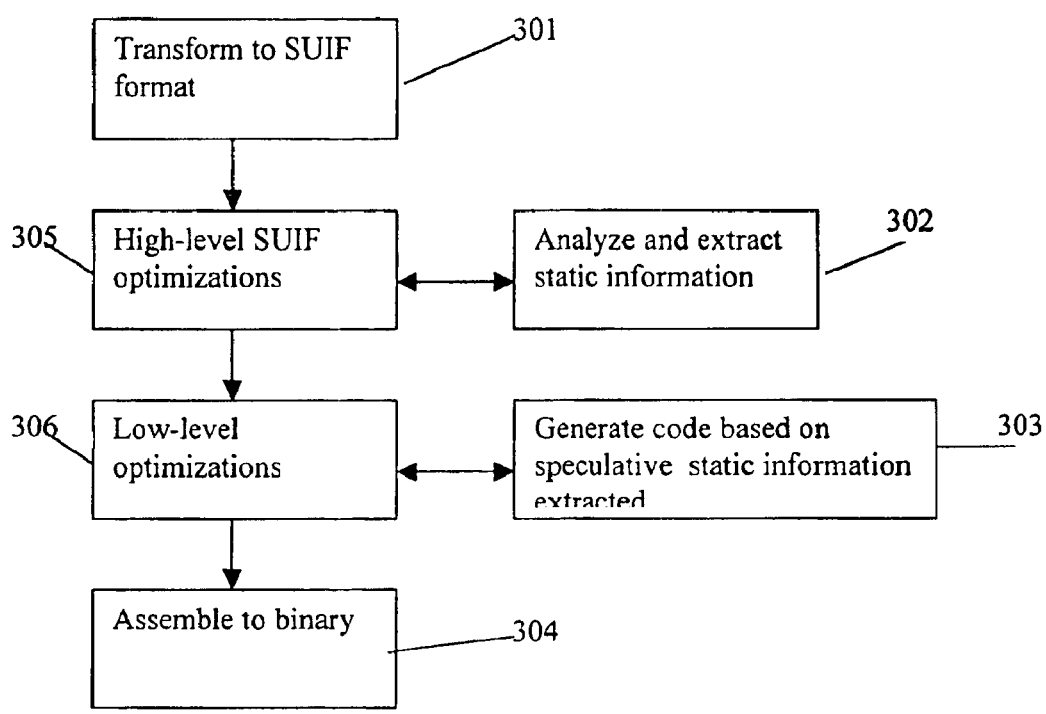
FIG. 5 is a flow diagram of an embodiment of the compilation process.

FIG. 5 shows a high-level picture of the stages involved in an embodiment for compilation. The implementation is using the SUIF format. The invention is not limited to this format or to the compilation embodiment presented.

The program sources are first converted to the intermediate format 301 and high-level optimizations are performed 306. Following that is the Alias Analysis stage, or equivalent, and the Hotlines passes 302. Alias information enables the Hotline Analysis to more economically assign hotlines to references (i.e., map cache pointers to registers). Without alias analysis, the compiler would liberally assign each memory reference a new hotline number. This will have a downgrading effect only if the number of references within inner loop bodies is more than the number of hotlines, resulting in the same hotlines being assigned to possibly spatially far apart references. This would cause interference and result in lower prediction rates. For many applications, the media benchmarks tested in particular though, this is not so and the alias analysis stage could be omitted with minimal effect on the prediction rates. Code is generated based on the information extracted in 303. Optimizations are performed on the high-level representation 305 (e.g., based on expression trees) and low-level representation 306 (e.g., flat instruction sequences). Finally the generated code is run through an assembler 304 and results in a binary.

The Section "Hotlines With Speculative Alias analysis shows a speculative data-flow analysis technique that further improves on the precision the range of location sets is determined and extends its scope to large and complex applications. Additional passes include code generation 303 that takes into consideration the results of the analysis above, and then assembling the code 305 into a binary format.

Caches represent a large fraction of processor power consumption. Given accesses, a speculative analysis to predict which cache line is being accessed is used. Although it is impossible do this with perfect accuracy, the methods described herein provide an approach with good overall accuracy. Moreover, as pointed out above, it is not necessary for predictions to be perfect, rather, they should be right sufficiently often that one can make beneficial use of them.

Almost all programs exhibit the behavior where certain cache lines are "hot", i.e., they are being used much more frequently than others. If the compiler can register promote the cache pointers for these hot cache lines, the lookup for the many accesses mapping to these cache lines can be avoided, i.e., the compiler can identify at cache lines that are heavily used, and for all accesses going to these, map them through an energy-efficient memory access mechanism.

Basic Hotlines Analysis

This process assigns each variable name a different hotline register starting with the first register. When all the registers have been used up, it wraps around back to the first register. The following example illustrates this process:

```
for(i = 0; i < 100; i++) {
    a[i]{1} = a[i+1]{1};        // numbers in curly braces
    b[i]{2} = 0;                 // are the hotline registers
        *(p++){3} = 1;           // assigned by the process
}
```

The variables have been assigned three hotline registers. For example, the hotlines process predicts that all the a[ ] accesses for example, will map to the same cache line and register promotes the cache pointer in register 1.

In particular, if the a[ ] is a word-sized array and the cache line is 8 words wide, a[0] and a[7] could map to one cache line, a[8] through a [15] to another, and so on.

Therefore, for this case, the process has seven correct predictions for every misprediction.

In general, this simple process works well with programs with high spatial locality, like multimedia programs. Below, enhancements to the basic approach are described.

Hotlines Combined with Alias Analysis

An accurate flow and context sensitive alias analysis can reveal the location set that any pointer can be pointing to at any given context in the program. Consider the following example:

int a[100], b[100];

```
if (. . . .) p = a; else p = b;
for(i = 0; i < 100; i++) {
    a[i] = 0;
        *(p++) = 1; // location_set(p) = {a, b}
}
```

The if-statement assigns either the array a or b to the pointer p. This means that inside the loop, p could be accessing either array a or b.

A context- and flow-sensitive compiler would extract this information: the location sets of pointers at various points in the program. As mentioned earlier, this can help in a more efficient hotline process: perform alias analysis and then during the hotlines phase, utilize alias information to better handle pointer-based accesses.

Perfect alias analysis is not typically possible for large and complex applications, especially those using precompiled libraries. Instead, a speculative alias analysis is developed as part of the solution proposed. This is described in Section "Hotlines with Speculative Alias Analysis".

Enhancement with Type, Distance and Dependence Analysis

This process hotlines all accesses like the basic hotline process, but is more refined. If an array a[ ] has been mapped through register r1, it won't necessarily be mapped through register 1 again. Instead the process will try to calculate the spatial distance of this access to the previous one. Only if they are sufficiently close will they be mapped through the same register.

The following example illustrates how the process works:

```
for(i = 0; i <100; i++) {
    a[i]{1} = a[i+1]{1} = a[i+100]{2} + a[i+103]{2};
    b[i]{3} = 0;              // number in curly braces is the hotline
    p{4} = p→next{4}         // register assigned by the process
}
```

Suppose the array element-size is 4 bytes, the cache line is 64 bytes, and that two accesses are mapped to the same register if they are within 32 bytes from each other.

The hotlines process first assigns a[i] hotline register r1. When it comes to a[i+1], it checks the distance from currently mapped accesses, and finds the closest one to be a[i] which is 4 bytes apart. Since this is within the threshold, a[i+1] is also mapped through r1. For a[i+100], the closest access a[i+1] is 396 bytes apart, and hence a[i+100] is mapped through a different hotline. The array accesses b[ ] is assigned register r3 and so on.

In evaluating the distance between two accesses, the hotlines process uses control-flow, loop structure, dependence and type information: field offsets in structures, array element sizes, etc.

Support for Various Levels of Static Speculation

This process can be made to vary in its level of aggressiveness. A very aggressive version would carry out actions based on predictions which do not necessarily have a high degree of confidence.

A conservative version may not do so, for instance, it would not hotline non-affine array accesses of the form a[b[i]] which are generally hard to predict. Different versions of this process with different levels of aggressiveness can be constructed. The invention is not limited to one particular implementation.

Hotlines with Speculative Alias Analysis

This analysis is part of the embodiment presented for the compilation process. The objective of this analysis is to extract precise information about memory access patterns in pointer based accesses. The proposed technique is speculative in the sense that the possible values for each pointer access are determined and included based on their likelihood of occurrence at runtime. Unlikely values are ignored and highly likely values are added, even when the full proof cannot be derived at compile-time.

One of the primary motivations for developing the speculative alias analysis (SAA) process is because the more precise implementations of non-speculative alias analysis have limitations when used for large programs or when special constructs such as pointer based calls, recursion, or library calls are found in the program. The less precise alias analysis techniques, that are typically used in optimizing compilers, have lower complexities but they are much less useful in the context of extracting precise information about memory access patterns. The experience with several state-of-the-art research alias analysis packages shows that they don't work well for these programs. For example, none of the SPEC2000 benchmarks could be analyzed with them. SAA based analysis can not only be applied without restrictions and has lower complexity, but also provides more precise information about memory accesses.

The information given by this analysis can be used in the hotlines processes, e.g., to determine which cache pointer (or hotline register) to assign to a given pointer based memory access. Additionally, the same information can be used in disambiguating pointer based loop-carried dependencies, to estimate loop level parallelism in addition to ILP.

There are two ways to give pointer information: (1) through program-point information, and (2) through global information. FIG. 6 shows a simple C program and illustrates the difference between these representations.

Program point information for example would show that at the end of the program segment in FIG. 6, pointer p points to {y,z}, a more precise information, compared with the global information case where p points to {x,y,z}. Although global information can be extracted with much more efficient analysis process, it gives less precise results.

In general, alias analysis is done at either the intra-procedural level or at the inter-procedural level. The latter considers analysis across call statements, attempts to handle recursive, and pointer-based calls.

For intra-procedural analysis, a variety of processes with different degrees of precision and efficiency have been developed. A more precise analysis results in narrower sets (i.e., fewer possible values for a pointer to take). Flow-sensitive analysis takes control flow into account usually giving program-point results. Flow-insensitive analysis views a program as a set of statements that can be executed in any order and gives per program or global results.

Flow-insensitive processes can be built on top of a type-based analysis or constrained-based analysis. Because of the higher precision of flow-sensitive approaches are of more interest in these techniques. Flow-sensitive approaches are typically based on traditional dataflow analysis, where pointer information is represented with points-to graphs (PTG). The speculative approach defined in the SAA process could be applied to any type of alias analysis.

Nodes in a PTG correspond to program variables and edges represent points-to relations. A points-to relation connects two variables and means that a pointer variable can take the value of another variable during execution. Intuitively, a smaller number of points-to relations means better precision.

Figure 7:
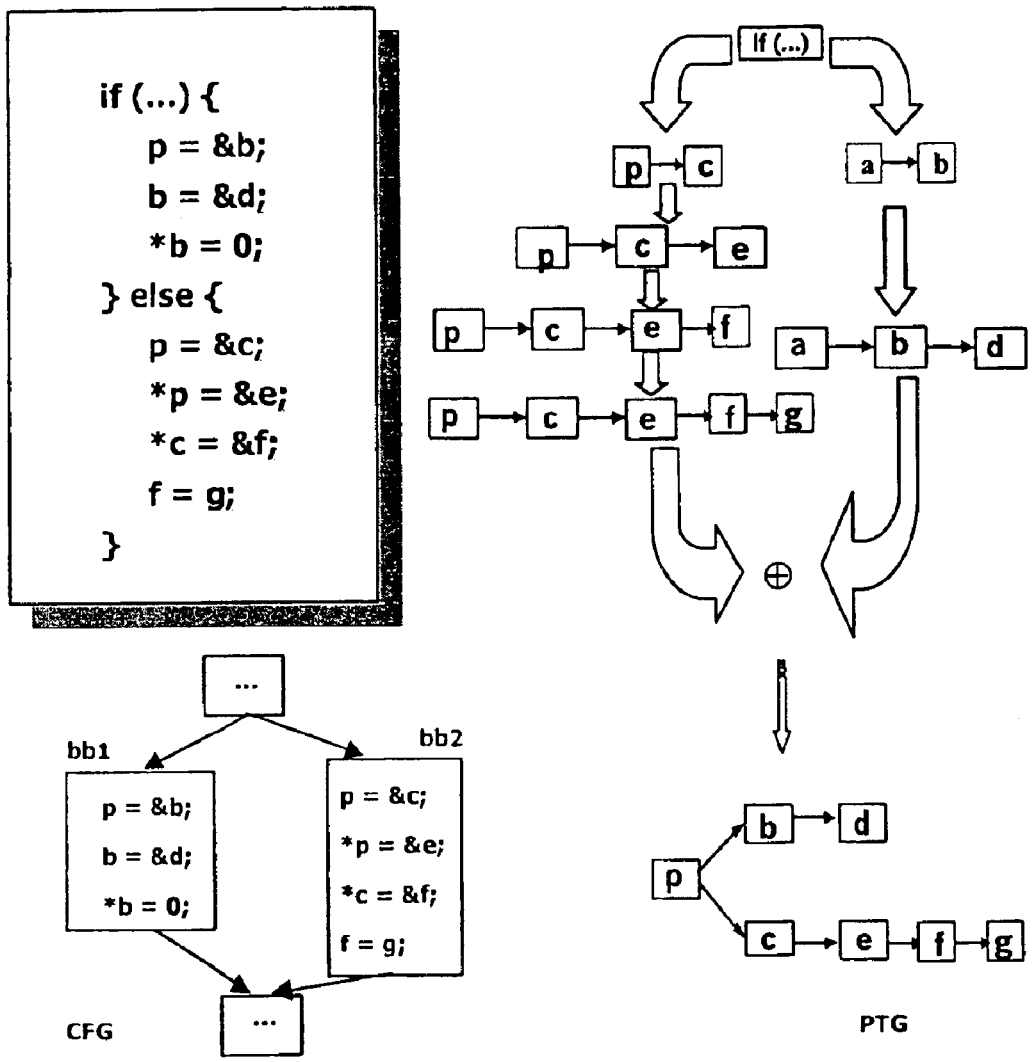
FIG. 7 is a diagram representing CFG and PTG graphs derived for a simple C program.

The main steps in a non-speculative flow-sensitive analysis process are as follows: (1) build a control-flow graph (CFG) of the computation, (2) analyze each basic block in the CFG gradually building a PTG, (3) at the beginning of each basic block merge information from previous basic blocks, (4) repeat steps 2–3 until the PTG graph does not change. See for example in FIG. 7, the CFG and the PTG for a simple C application.

This analysis builds a PTG for the program in a conservative way, i.e., it guarantees that for each variable all the possible points-to relations are captured. The SAA approach removes some of these points-to relations when it predicts them as seldom-occurring. A point-to relation is defined to be a weak points-to relation if the edge is less likely to be leveraged during execution compared to other points-to relations from the same pointer variable.

Figure 8:
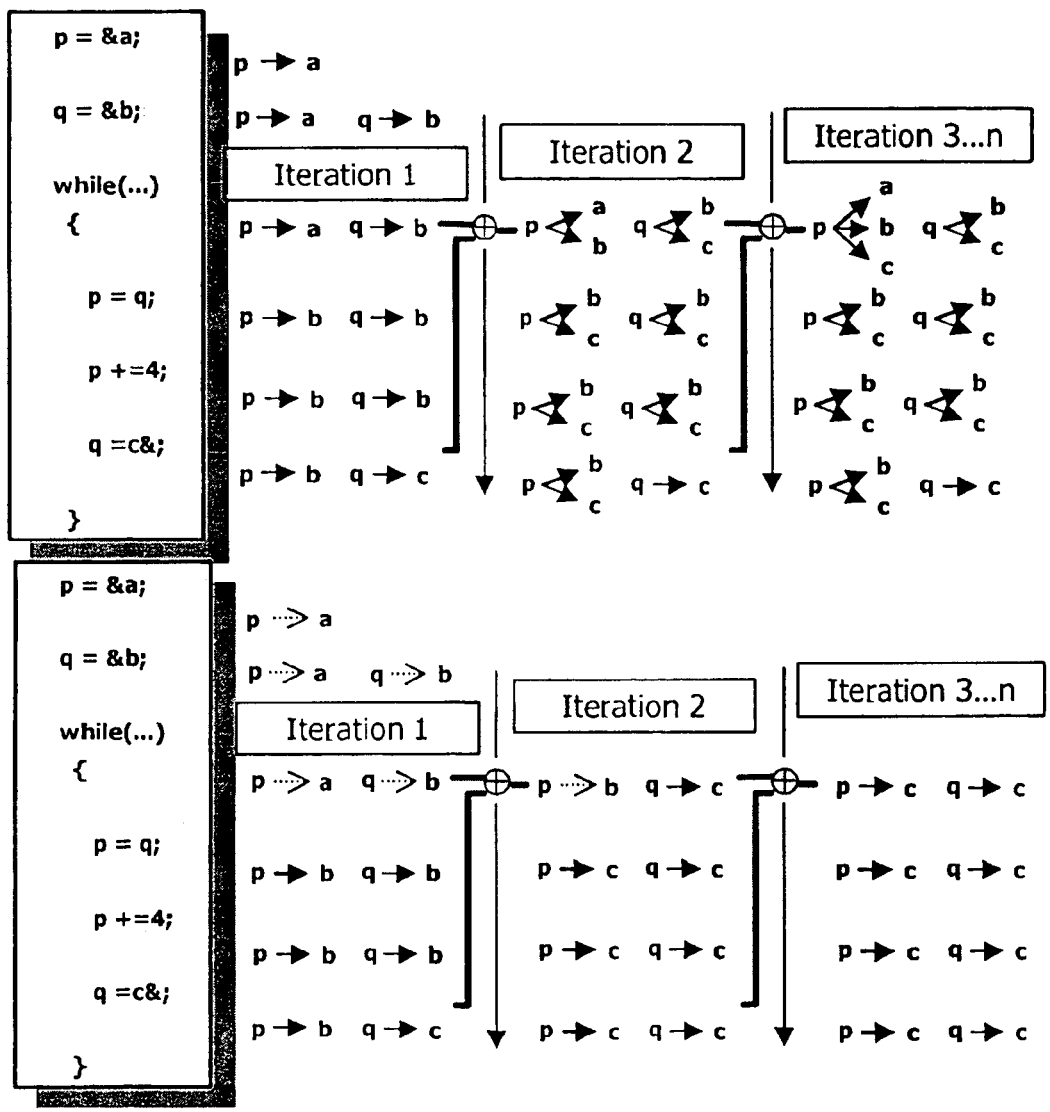
FIG. 8 is a diagram representing a simple loop-based example analyzed with traditional flow-sensitive AA (top) and the SAA method (bottom), that shows that SAA achieves higher precision by removing all weak point-to relations after each merging-step, where the weak point-to relations are shown with dotted arrows.

FIG. 8 exemplifies the flow-sensitive embodiment of the SAA process in loops, for the simple case when point-to relations are mapped to either weak or strong ones. One of the process's rules is that the incoming location sets are the weak point-to relations, and are removed if there is any strong point-to relation for the same access within the loop body. A generalization of this process, for nested loops, is to consider loop nests organized in pairs, with inner loop updates being strong and incoming edges weak, and so on.

FIG. 8 shows that a great deal of precision has been obtained by removing several edges in the PTG. For example, both pointer p and q has been determined to point to only variable c after only three iterations in the process.

The complexity of the SAA process is reduced compared to traditional alias analysis process. One possible implementation is by stopping the dataflow analysis after a certain number of iterations. Other implementations are also possible. The main complexity in non-speculative alias analysis is coming from dealing with loops, recursive calls, multi-threaded analysis, and library calls in an inter-procedural analysis. The analysis in the SAA process applies an approximate approach and stops the dataflow analysis before full convergence is reached in such cases. Library calls that may modify pointer values and for which source codes are not available can also be speculatively estimated or ignored.

An example of implementation of the SAA process is as follows: (1) build a control-flow graph (CFG) of the computation, (2) analyze each basic block in the CFG gradually building a points-to graph (PTG), (3) at the beginning of each basic block merge information from previous basic blocks, (4) annotate weak and strong point-to relations focusing on loops by looking at incoming point-to relations and point-to relations in loop bodies, (5) speculatively estimate recursive calls and library calls, (6) repeat steps 2–5 until the PTG graph does not change or until a predetermined number of steps in the analysis have been reached.

The methods described in this embodiment have been implemented and carefully evaluated.

Figure 9:
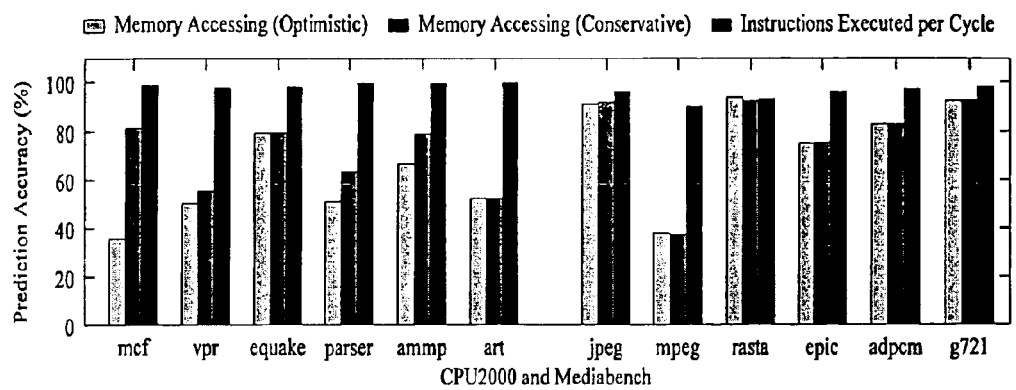
FIG. 9 is a diagram showing the accuracy of static speculation for one set of parameters suing the industry standard CPU2000 and Mediabench benchmarks.

A small sampling of data giving a preview of the accuracy of static speculation obtained with this implementation is presented in FIG. 9. As shown, both memory accessing and instructions executed per cycle could be predicted statically with good accuracy. Better prediction translates into the possibility of saving more energy.

Figure 10:
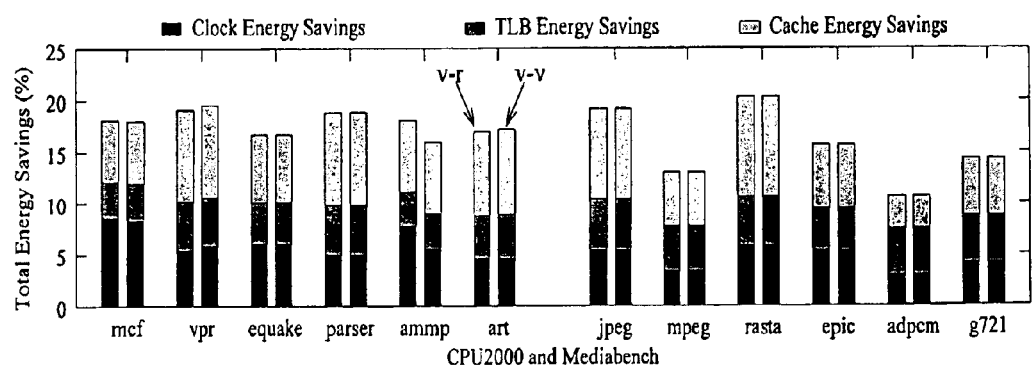
FIG. 10 is a diagram showing chip-wide energy reduction due to reduction in memory consumption obtained with the microarchitecture in the second embodiment as compared to an Alpha 21264 processor.

FIG. 10 shows the breakdown of processor-wide energy savings obtained due to significantly reduced energy consumed in the memory system. It shows that up to 75% of the energy consumed in memory accessing can be saved. This translates into up to 21% total energy reduction in an Alpha 21264 type of processor. A description of some the benchmarks evaluated, but not limited to, is presented in FIG. 11.

The invention is not limited to, but can also be used to improve performance in processors. Reduction of access latencies in caches, for example, in the embodiments shown, can improve memory accessing performance. Alternatively, it can enable faster clock rates that would reduce execution time, or would enable using larger caches that would improve memory performance. Other performance benefits can result from, but not limited to, more efficient execution.

Other embodiments not described herein are also within the scope of the following claims.

What is claimed is:

1. A processor framework comprising:
   a compiler which compiles a computer program, the compiler extracting speculative static information about memory accesses during compilation; and
   a microarchitecture which performs a memory access using the speculative static information extracted during compiling.

2. The processor framework of claim 1, wherein a memory that is accessed via the memory access comprises at least one of:
   a memory hierarchy having at least one layer; and
   a multi-mechanism associative cache where tag access and way access are not performed and address translation is not performed or is postponed to a low layer in a cache hierarchy.

3. The processor framework of claim 2, wherein the microarchitecture accesses the cache without using a tag memory.

4. The processor framework of claim 1, wherein address translation is not performed.

5. The processor framework of claim 2, wherein address translation is postponed to low layers in the memory hierarchy.

6. The processor framework of claim 1, further comprising:
   an instruction set architecture to encode information about accessing memory at run time and to select access mechanisms to perform an individual memory access.

7. The processor framework of claim 1, wherein the microarchitecture performs a protection check for the memory access.

8. The processor framework of claim 7, wherein protection checking information for performing the protection check is incorporated in one or more tags.

9. The processor framework of claim 1, wherein the microarchitecture accesses memory using a tag memory.

10. The processor framework of claim 9, wherein the tag contains support for performing a protection check for the memory access.

11. The processor framework of claim 1, wherein the microarchitecture accesses memory without using a TLB.

12. The processor framework of claim 1, wherein the compiler dictates a first mechanism for the microarchitecture to use to access memory and run-time events dictate a second mechanism for the microarchitecture to use to access the memory.

13. The processor framework of claim 12, wherein the first and second mechanisms are used in combination.

14. The processor framework of claim 1, wherein the compiler encodes information relating to at least some address translations between logical memory block addresses and physical cache block addresses.

15. The processor framework of claim 1, wherein the compiler identifies memory accesses that are at least likely to go to a cache line, a cache block, a cache way, a cache set, and a cache bank.

16. The processor framework of claim 1, wherein the microarchitecture verifies a correctness of the speculative static information and provides a mechanism to recover in a case of misprediction.

17. The processor framework of claim 1, wherein the compiler performs different levels of speculation to extract different levels of speculative static information, and wherein one of the levels of speculative static information is selected for use by the microarchitecture.

18. The processor framework of claim 1, further comprising:
   a memory hierarchy having at least one level;
   wherein the memory access comprises an access into the memory hierarchy.

19. The processor framework of claim 1, further comprising:
   a virtual-virtual memory architecture; and
   a translation buffer for performing a memory translation;
   wherein virtual memory related address translation is performed following an L1 cache or following an L2 cache, is supported by all access mechanisms, and is performed by using translation buffers and/or software methods that can be integrated with statically driven memory access mechanisms.

20. The processor framework of claim 1, further comprising:
   a virtual-physical memory architecture; and
   a translation buffer for performing memory translation;
   wherein virtual memory related address translation is performed following an L1 cache or following an L2 cache, is supported by all access mechanisms, and is performed by using translation buffers and/or software methods that can be integrated with statically driven memory access mechanisms.

21. The processor framework of claim 1, further comprising:
   a virtual-virtual memory architecture; and
   a memory that stores executable instructions to perform memory translation;
   wherein virtual memory related address translation is performed following an L1 cache or following an L2 cache, is supported by all access mechanisms, and is performed by using translation buffers and/or software methods that can be integrated with statically driven memory access mechanisms.

22. The processor framework of claim 1, further comprising:
   a virtual-physical memory architecture; and
   a memory that stores executable instructions to perform memory translation;
   wherein virtual memory related address translation is performed following an L1 cache or following an L2 cache, is supported by all access mechanisms, and is performed by using translation buffers and/or software methods that can be integrated with statically driven memory access mechanisms.

23. The processor framework of claim 1, wherein address space identifiers are added on all memory access paths.

24. The processor framework of claim 1, wherein a memory that is accessed via the memory access comprises a cache and the microarchitecture accesses the cache a number of times without using tags.

25. The processor framework of claim 1, wherein a memory that is accessed via the memory access comprises a register and the microarchitecture accesses the register without using a way access.

26. The processor framework of claim 1, wherein a memory that is accessed via the memory access comprises a random access memory and the microarchitecture accesses the random access memory without using a way access.

27. A processor framework comprising:
a compiler which
(i) extracts memory access information speculatively; and
(ii) determines which of plural memory access mechanisms to use for a memory access based on extracted memory access information.

28. The processor framework of claim 27, wherein the compiler performs an analysis related to a register access mechanism that is used at run time to direct accesses to a cache, the analysis assigning program variable names to a second register starting with a first register and wrapping around back to the first register.

29. The processor framework of claim 28, wherein the analysis determines which program variable to assign to which of plural registers.

30. The processor framework of claim 28, wherein the analysis takes into account one or more of program variable type, distance, dependence, and an alias analysis.

31. The processor framework of claim 30, wherein the analysis includes:
evaluating a distance between information relating to program variables and determining when the distance is larger than a predetermined threshold; and
assigning a program variable to another register when the distance is larger than the predetermined threshold.

32. The processor framework of claim 31, wherein a same register is used for different memory accesses and wherein the analysis is set to reuse a same register.

33. The processor framework of claim 32, wherein a frequency at which the register is reused is based on the extracted memory access information.

34. The processor framework of claim 33, wherein the compiler performs dependence testing, control-flow analysis, and data-flow analysis driven by a likelihood of correctness of information at any point in the analysis.

35. A processor framework comprising:
a compiler which performs a speculative alias analysis (SAA) to extract speculative static information during compiling of a computer program that is pointer-based, the speculative alias analysis ignoring unlikely values for a pointer and adding likely values for the pointer.

36. The processor framework of claim 35, wherein the SAA analysis is context-sensitive and flow-sensitive.

37. The processor framework of claim 35, wherein the SAA analysis is either context-sensitive, flow-sensitive, non-context-sensitive, or non-flow-sensitive.

38. The processor framework of claim 35, wherein the SAA analysis can handle pointer-based calls, recursion, and/or library calls in the computer program.

39. The processor framework of claim 35, wherein the compiler applies the SAA analysis to only a portion of the computer program.

40. The processor framework of claim 35, wherein the compiler applies the SAA analysis to source code of the computer program that contains a precompiled static library.

41. The processor framework of claim 35, wherein the SAA analysis is used with respect to information relating to pointer values.

42. The processor framework of claim 35, wherein the SAA analysis determines when loop iterations in the computer program are independent in a presence of loop carried dependencies.

43. The processor framework of claim 35, wherein the compiler uses the SAA analysis in compiler-managed memory dependence speculation.

44. The processor framework of claim 35, wherein the compiler uses the SAA analysis in a speculative parallelization technique.

45. The processor framework of claim 35, wherein the SAA analysis takes into account strength of each point-to-relation in a point-to graph, where strength is determined by a criticality of code in the computer program.

46. The processor framework of claim 45, wherein the compiler makes a strength of a point-to relation weaker if the point-to relation comes from an outer loop nest in the computer program.

47. The processor framework of claim 35, wherein the SAA analysis comprises at least one of an inter-procedural and intra-procedural analysis.

48. The processor framework of claim 35, wherein the SAA analysis is stopped after a fixed number of steps.

* * * * *